May 24, 1932. A. MUELLER 1,859,980
LOOSE EAR CORN AND VEGETABLE HARVESTING DEVICE
Filed Aug. 16, 1929 2 Sheets-Sheet 1

INVENTOR:
ALBERT MUELLER,
BY H. S. Woodward
ATTORNEY.

May 24, 1932.   A. MUELLER   1,859,980
LOOSE EAR CORN AND VEGETABLE HARVESTING DEVICE
Filed Aug. 16, 1929   2 Sheets-Sheet 2
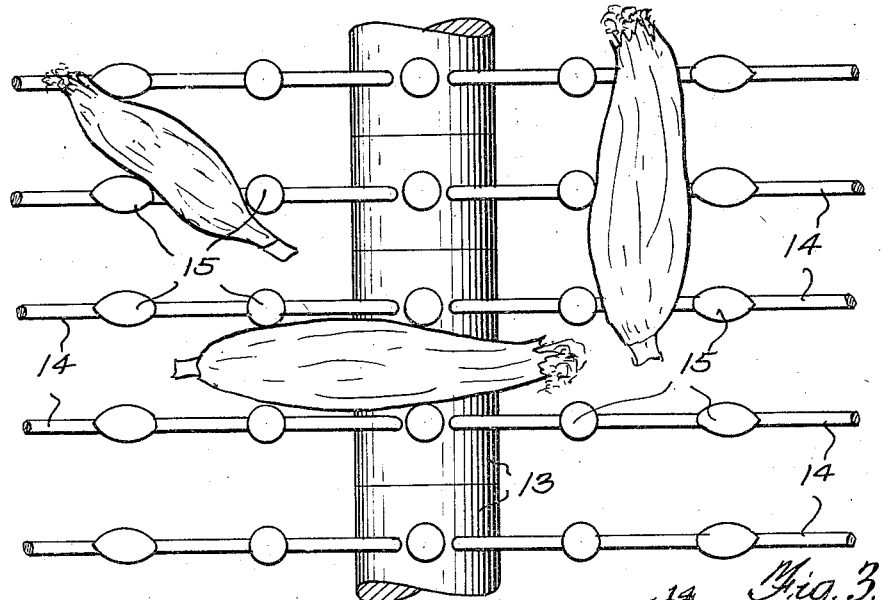
Fig. 3.
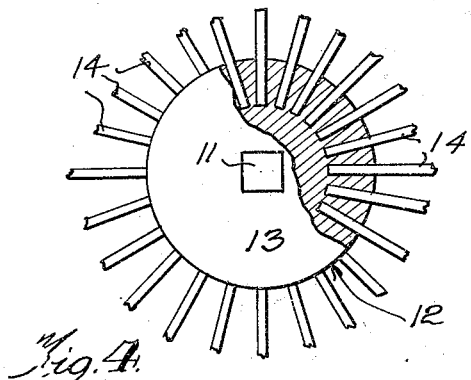
Fig. 4.
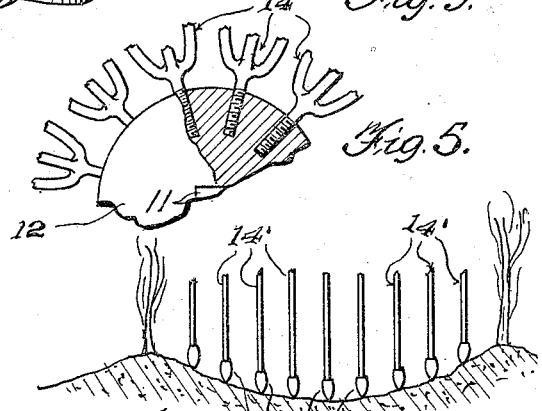
Fig. 5.
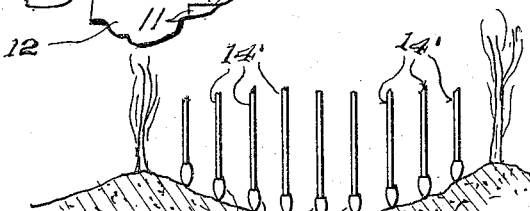
Fig. 8.
Fig. 6.
Fig. 7.
Inventor:
ALBERT MUELLER,
By HSWoodward
Attorney Patented May 24, 1932

1,859,980

UNITED STATES PATENT OFFICE

ALBERT MUELLER, OF COLUMBUS, NEBRASKA

LOOSE EAR CORN AND VEGETABLE HARVESTING DEVICE

Application filed August 16, 1929. Serial No. 386,292.

This invention has for a primary object to provide a device which may be used either by itself or in combination with a corn harvester or other harvester device adapted to remove ears or heads from the standing plants, of an appliance adapted to gather fallen ears or other products lying upon the ground, and deliver them to a desired point. A further important object is to provide a device of this kind which will gather corn, fruits and vegetables without material damage to them. A further aim is to present a novel structure in a reel for picking up ears and the like upon the ground, combining desirable features for such appliances. A further important aim is to present a device of such character as will be liable in a minimum degree to impairment and which may be readily constructed at a reasonable cost and operated in a simple manner.

Additional objects, advantages and features of invention reside in the construction, arrangement and combination of parts in the embodiment of the invention, as will be more readily understood from the following description and accompanying drawings, wherein Figure 1 is a side view of a device embodying the invention, Figure 2 is a top view thereof.

Figure 3 is a bottom view of the device showing ears of corn engaged therein,

Figure 4 is a sectional view of the hub of one of the lifter wheels.

Figure 5 is a similar view of a modification of a hub construction.

Figure 6 is a top view of a deflector guard adapted to turn stalks and the like out of the way of the appliance used for gathering products from the ground.

Figure 7 is a side view of the shield.

Figure 8 is a front view of a portion of a modified form of the device.

Figure 1:
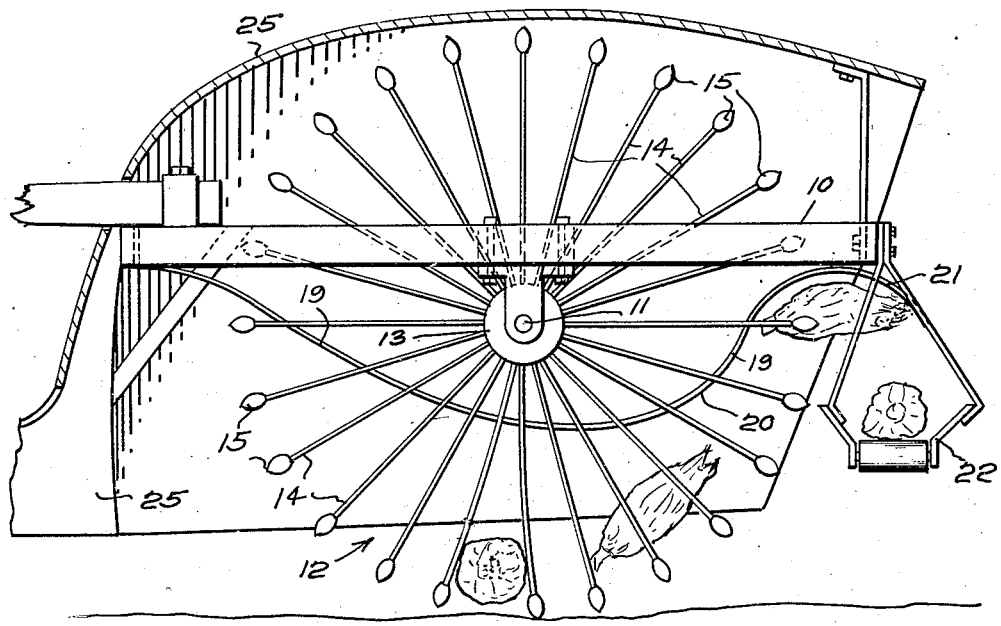
Figure 2:
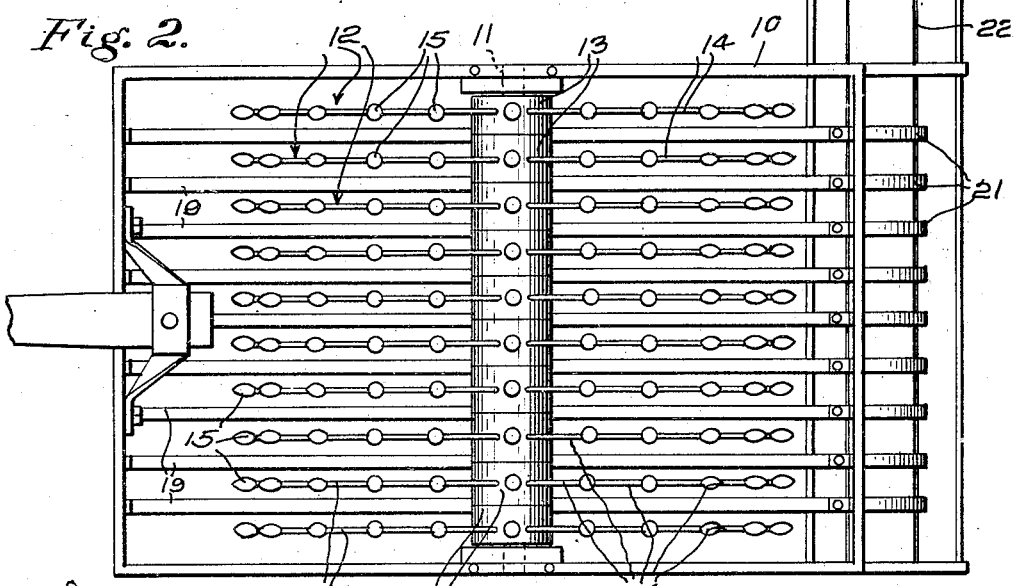

There is illustrated a loose ear harvester device comprising a rectangular frame 10, freely movable vertically, which may have individual draft or propelling means, or may be incorporated as part of some other approved type of harvesting device. Transversely of this frame on its under side there is mounted a revoluble shaft 11, rectangular in cross section, on which there are fixed a multiplicity of idle reels 12 each of which includes a hub 13 receiving therethrough the shaft 11, and a multiplicity of resilient spokes or tines 14, cast or otherwise set in the hub, each tine having at its outer end a knob 15 of rounded form although it may be ovate in the direction of the axis of the tine. Knobs 15 on the reel are preferably spaced a distance of not more than two and one half inches apart, and knobs on mutually adjacent reels are similarly spaced apart. The tines 14 are preferably made of flexible steel rods adapted to be bent readily when mutually adjacent knobs 15 pass on opposite sides of a vegetable, so as to admit the vegetables between the upper parts of the tines above the knobs, where it will be retained and carried by the reel. The reel devices are in sufficient number to cover the distance between two rows of corn, although the size of the device may be varied to suit various crops. The knobs 15 on the tines engage the ground so as to support the device without auxiliary wheels of any kind, as may be understood. It is also desirable that no auxiliary wheels be used, in order to permit the knobs 15 to sink slightly into the ground such as is found in cultivated fields, so that the knobs may engage more readily below a vegetable as indicated. Between each two mutually adjacent reels a longitudinal clearing bar 19 is located, supported on the front and rear transverse members of the frame. The forward part of the bar extends rearwardly from its end into close relation with the hubs of the reels, thence downwardly and rearwardly, with a gradual curve convergent toward the orbital path of the knobs 15, as at 20 in Figure 1. Immediately beyond the path of the knobs 15 the bar 19 is curved downwardly so that the extremity of the bar lies a distance spaced from the path of the knobs 15. Immediately below the downturned end 21 of the clearing bars, a transverse conveyor 22 is shown, which may be of any approved construction and operation.

In the operation of this device, it is drawn over the ground upon which the loose corn or other vegetables may lie, and when an ear of corn or the like is engaged, the knobs on the tines pass closely beside it and therebelow, so that when the reel passes over the vegetable, these knobs lift the vegetable which is soon engaged at the inner side of the clearing bar 19, and is forced longitudinally outward from between the tines so as to drop into the conveyor 22.

The tines may have the hubs cast thereon or may be formed with threads and screwed into the hubs removably, whereby they may be readily removed for repair, or replacement. In such case it will be desirable to form a plurality of outer tines upon a single threaded shank as at 14'.

As may be seen, the objects which may be picked up by the tines do not have to be of regular form, nor do they require to be alined with the path of the device or arranged in any particular relation to the series arrangement of the tines upon the reel. As may be seen in Figure 3, the corn ear may be arranged longitudinally of the path of the device, transversely or diagonally, and still will be coengaged so that it will be effectively lifted.

In Figure 6 I have shown a fender device which may be mounted upon the front of the frame 10 so as to pass closely adjacent two rows of corn, and lift any broken or fallen stalks which lie in the path of the gathering device which might tend to prevent its proper functioning or cause lifting of undesired material. The construction of the device may be accomplished at a low cost, both for material and labor in construction and assembly, and the appliance may be adapted to various vegetables for the lifting thereof to good purpose. The tine devices may be made of thinner or thicker material and may be multiplied in number and more closely spaced for gathering of delicate or small fruits, and on the other hand, may be made stronger and more widely spaced for gathering of large objects.

In Figure 8 there is indicated a preferable proportioning of the sizes of the reel units whereby the appliance will accommodate itself more efficiently to the contour of the ground between two rows of corn or such other vegetables as may be involved. In this instance the tines 14'' on the units at each side of the middle unit are progressively shorter, so that a line across the extremities of a transverse series of the knobs 15 will be curved, the convexity approximating the concavity of the ground transversely between two adjacent rows of plants. In this way the liability of the central knobs being raised above the ground or those at the sides sinking unduly thereinto is obviated and a more certain pick-up of the vegetable assured.

Figure 9:
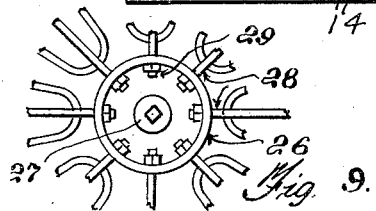
Figures 9 and 10 are details of a preferred hub construction.
Figure 10:
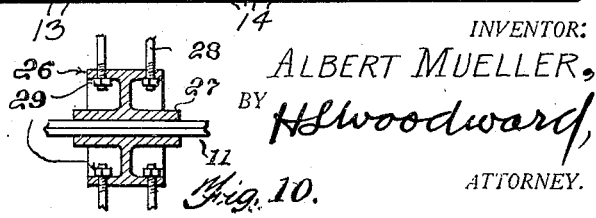

To lighten the construction and facilitate production and assembly of parts, the hubs may preferably be cast with an annular rim 26 of sufficient radius, connected by spokes or web with a hub proper 27 which may be fitted on the assembly shaft as before described (see Figures 9 and 10). The space between the rim 26 and the hub 27 is sufficient to permit the inner ends of the tine bases 28 to project through the rim a distance and to receive and permit ready fitting and tightening of nuts 29 on these exposed ends. The tine bases are threaded and screwed into the rim 26 and the nuts serve as locking means to hold the tines in their radial adjustment and prevent loosening of the tines.

I claim:

1. A device of the character described comprising a frame, a multiplicity of reel elements mounted revolubly on the frame in close spaced relation and having flexible tines adapted to engage the ground and support the frame and clearing bars alternated between the reels, extending longitudinally of the frame from a high point at the forward part rearwardly beneath the axis of the reels but spaced closely thereadjacent, thence convergently toward the perimeter of the path of rotation of the reels and beyond for clearance of objects from between the tines.

2. In a harvesting machine of the character described, a reel adapted to rotate in engagement with the ground, said reel having a multiplicity of article gathering tines, in laterally spaced series, and clearing bars alternated with the series of tines extending from a point below and adjacent the axis of the reel and a substantial distance inwardly of the ends of the tines, thence upwardly convergent from within to the perimeter of the path of rotation of the ends of the tines in the direction of rotation and extending beyond the tines for clearance of objects at the lower sides of the clearing bars.

In testimony whereof I affix my signature.

ALBERT MUELLER.